United States Patent
Zansky et al.

(10) Patent No.: US 7,952,231 B1
(45) Date of Patent: May 31, 2011

(54) METHOD AND SYSTEM FOR PROVIDING SUPPLEMENTAL POWER

(75) Inventors: Zoltan Zansky, Sunnyvale, CA (US);
Bill Jacobsen, Sunnyvale, CA (US);
Roshan Thakur, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 241 days.

(21) Appl. No.: 12/262,715

(22) Filed: Oct. 31, 2008

(51) Int. Cl.
*H02J 1/10* (2006.01)

(52) U.S. Cl. ................ 307/59; 307/44; 307/48

(58) Field of Classification Search .......... 307/44, 307/46, 48, 59, 66, 80
See application file for complete search history.

(56) References Cited

U.S. PATENT DOCUMENTS

| | | | |
|---|---|---|---|
| 6,153,949 A * | 11/2000 | Soderhall | 307/125 |
| 6,369,461 B1 * | 4/2002 | Jungreis et al. | 307/46 |
| 6,977,448 B2 * | 12/2005 | Kanouda et al. | 307/66 |
| 7,017,055 B1 * | 3/2006 | Ho | 713/300 |
| 7,087,329 B2 * | 8/2006 | Converse et al. | 429/432 |
| 2006/0061955 A1 * | 3/2006 | Imblum | 361/685 |
| 2007/0182363 A1 * | 8/2007 | Yang | 320/107 |
| 2007/0192639 A1 * | 8/2007 | Nichols et al. | 713/300 |
| 2010/0133908 A1 * | 6/2010 | Weng | 307/48 |

* cited by examiner

*Primary Examiner* — Fritz M Fleming
(74) *Attorney, Agent, or Firm* — Suiter Swantz pc llo

(57) ABSTRACT

The present disclosure is a supplemental power system which may operate in conjunction with a power supply to provide supplemental power to a load. Supplemental power system may include a power storage device, a boost converter and a power storage charger. Supplemental power system may supply extra power required for a storage system load at startup whereby the power supply system may be sized for steady state operation of the load.

15 Claims, 5 Drawing Sheets

METHOD AND SYSTEM FOR PROVIDING SUPPLEMENTAL POWER

TECHNICAL FIELD

The present disclosure generally relates to the field of storage systems, and more particularly to a method and system for providing supplemental power.

BACKGROUND

Electrical energy in the form of Alternating Current (AC) is a commonly available power source found in buildings, including homes. AC power is typically supplied by a central utility via power lines or from a physical plant that is part of a facility. However, many common devices, including electronic circuits and DC motors, utilize electrical energy in the form of Direct Current (DC), which is electrical current that flows in one direction. Thus, it is often desirable to convert AC power to DC power.

Power supply systems convert AC power to DC power suitable for powering electrical components, also known as a load. A load of a storage system may require a large startup current followed by a reduced steady state current. Due to the large startup current, power supply systems may be sized to properly supply power according to the peak loads present during the startup condition, causing an increase in cost and size of the power supply system required to support the load.

SUMMARY

The present disclosure is directed to a method and system for providing supplemental power. A supplemental power system may operate in conjunction with a power supply to provide supplemental power to a load. Supplemental power system may include a power storage device, a boost converter and a power storage charger. Supplemental power system may provide supplemental power for a load, such as a storage system during a startup condition whereby the power supply may be sized for steady state operation of the load.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1-5, exemplary embodiments of a method and system for providing supplemental power are shown. The supplemental power system may be employed with at least one conventional power supply to provide supplemental power to a load, for example, during a peak power condition. A peak power condition may refer to a period of time when a load requires a higher amount of power, for example, a substantial amount of additional power, than the steady state requirement. It is contemplated that power may refer to an amount of current and an amount of voltage. Thus a peak power condition may refer to a condition of higher current usage while an amount of voltage may remain unchanged. A peak power condition may be experienced during a startup or boot process when the device is initially powered, or turned on. The load may be an array of disk drives of a storage system. An array of disk drives may require an additional amount of power during the spin-up of the array of disk drives which is required during a startup process. After the array of disk drives are spinning, a reduced steady state power amount may be provided by at least one conventional power supply sized for the reduced steady state power load.

Since the power supply may be sized for the lower power state of a storage system after the startup process, a size and cost benefit may be produced. For example, the form factor of reduced power capacity power supplies is less than the form factor associated with higher power capacity power supplies. Additionally, the cost associated with reduced power capacity power supplies is less than the cost associated with higher power capacity power supplies. A storage system may be sized to supply the reduced power load which may result in less hardware costs and a reduced form factor than a power supply system required to support a peak load power requirement during a startup process.

Additionally, supplemental power system employed with power supplies may reduce electrical usage costs. Electrical utilities charge customers based upon average power usage (kiloWattHours) and charge an additional amount for peak power usage. Hard disk drive arrays of a storage system typically have a high peak power usage to average power usage ratio due to the high peak power usage at startup in comparison with the low steady state power usage. Through a reduction of peak power usage to average power usage ratio, a consumer may reduce their electrical usage costs. The use of supplemental power system with a power supply system for powering a disk drive storage system may reduce peak power usage by supplying power for a peak power condition from a supplemental power source. This may reduce a ratio of peak power usage to average power usage and may reduce electrical usage costs.

Figure 1:
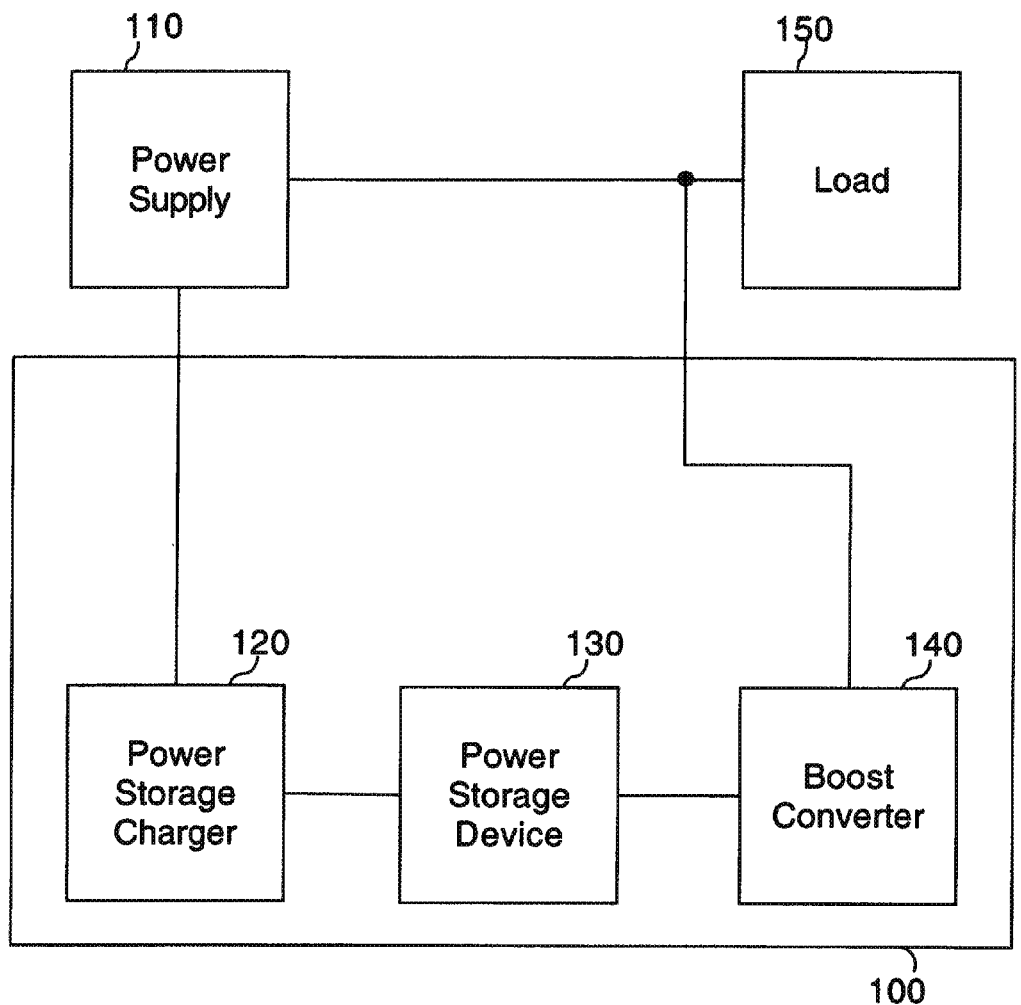
FIG. 1 depicts a block diagram of a supplemental power system.

Referring to FIG. 1, a block diagram of a supplemental power system 100 is shown. Supplemental power system 100 may be incorporated with a power supply 110 to provide supplemental power to a load 150. Power supply 110 may receive an alternating current (AC) supply and convert the AC supply to a DC supply suitable for load 150. Power supply 110 may include a transformer, rectifier, filter and regulator to accept an AC input supply and provide a regulated DC output supply. Power supply may have a power rating suitable to provide a steady state power amount with minimal excess capacity. Power capacity may be less than an amount of power capacity to provide enough power for a peak power condition. For example, power rating of power supply may be approximately equal, or slightly greater than the steady state power requirement of the load 150, such as less than 10 percent difference. It is contemplated that the supplemental power system 100 may be operable with any type of power supply without departing from the scope and intent of the present disclosure.

Supplemental power system 100 may include a power storage charger 120, a power storage device 130 and a boost converter 140. When the power supply 110 is receiving power from an AC source, power supply 110 may supply DC power to the power storage charger 120 to allow charging of the power storage device 130. It is contemplated that the output power of the power supply 110 may be utilized to provide power to the power storage charger 120. Power storage charger 120 may be a battery charger, capacitance charger and the like. Power storage device 130 may be a rechargeable battery, capacitor and the like. Rechargeable battery may be a lithium Ion battery, nickel cadmium battery and the like. If the output voltage of the power supply 110 is greater than the voltage necessary for the power storage charger 120, then the power storage charger 120 may include a buck converter comprising a transistor, diode and inductor to decrease the voltage supplied to the power storage charger 120.

Supplemental power system 100 may supply supplemental power in addition to the power supplied by power supply 110 to the load in order to supply load during a peak power condition, such as a startup process of a storage system including an array of disk drives. Power storage device 130 may supply an output to a boost converter 140 which may be coupled to the power storage device 130. Boost converter 140 may increase the output of the power storage device 130 to a higher voltage which may be supplied to the load 150. For example, boost converter 140 may receive a 3 volt input voltage and increase the input voltage to an output voltage of 12 volts. Boost converter 140 may include a controller, such as a pulse width modulated controller, which may control operation of the boost converter 140 to ensure a constant output supply is provided to load 150 during an entire period of the peak power condition, for example, from a few milliseconds to about thirty (30) seconds.

It is contemplated that boost converter 140 may be coupled to power supply 110 whereby boost converter may become operational when power supply 110 detects a peak power condition. Power supply 110 may include output voltage monitoring whereby the power supply may detect a peak power requirement for the load. When the power supply 110 detects a peak power condition, boost converter may become operational and supply supplemental power to the load 150 during the peak power condition. It is contemplated that a peak power condition may require a load current of about twice the current required during a steady state condition. For example, a steady state condition of a storage system may require a current of seven (7) Amperes. A peak power condition of a storage system may require a current of fifteen (15) Amperes whereby the additional current of eight (8) Amperes may be provided by supplemental power system 100 to allow power supply 110 to be sized to handle the steady state current requirement of seven (7) Amperes. It is further contemplated that a peak power condition may be about 25-30% greater than the steady state power requirement which may be provided by the supplemental power system 100.

Figure 2:
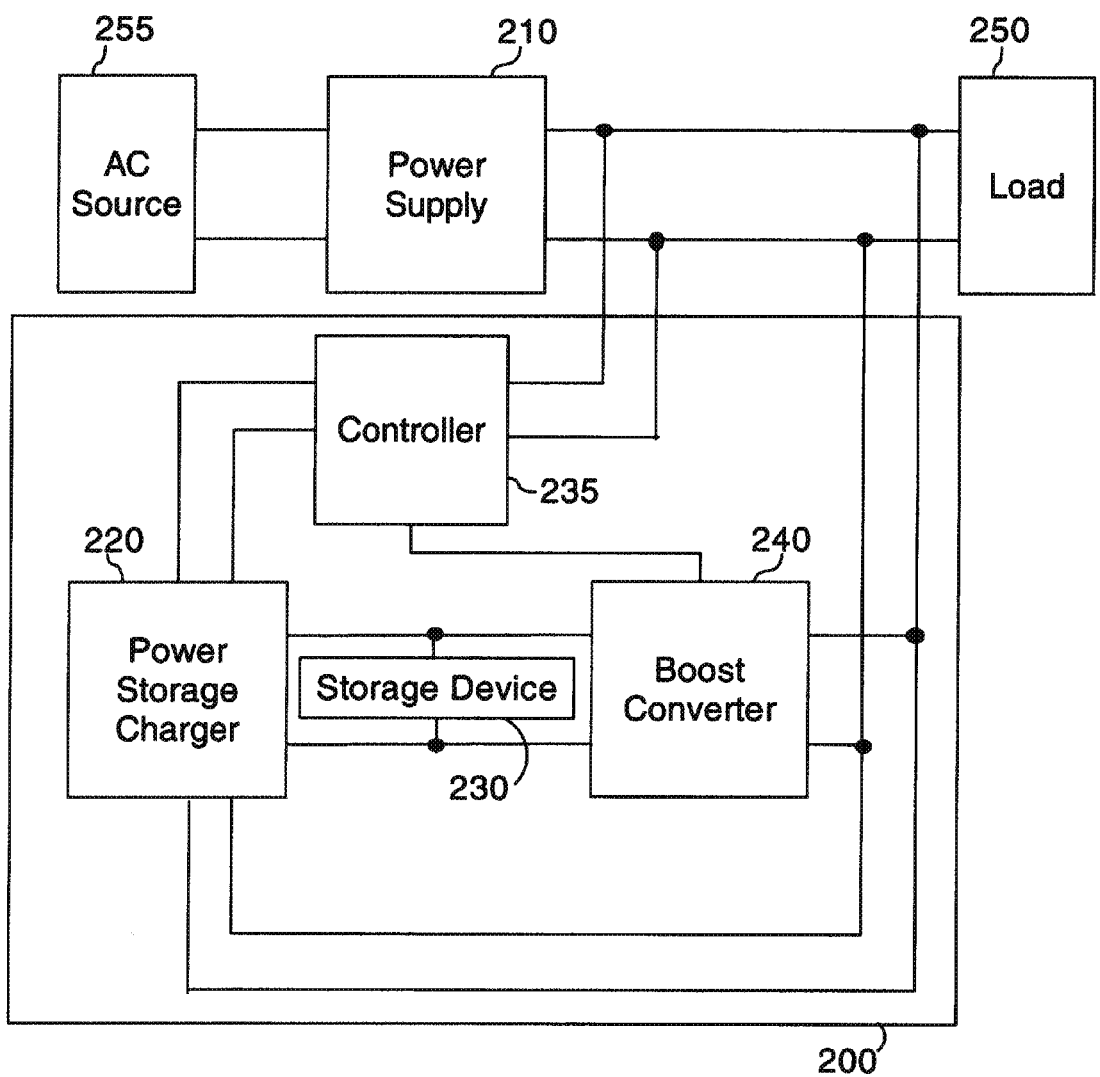
FIG. 2 depicts a circuit diagram of a supplemental power system.

Referring now to FIG. 2, a circuit diagram of a supplemental power system 200 is shown. Supplemental power system 200 may include a power storage charger 220, storage device 230, controller 235 and boost converter 240. Power supply 210 may receive power from an AC source 255 and may convert the AC supply to a regulated DC supply suitable for load 250. AC source 255 may refer to an AC utility outlet that may substantially provide a 120-240 Volt, 50-60 Hertz power supply.

Supplemental power system 200 may provide supplemental power in addition to the power provided by power supply 210 to the load in order to supply power to the load during a peak power condition, such as a startup process of a storage system including an array of disk drives. Power storage device 230 may provide an output to boost converter 240 which may be coupled to the power storage device 230. Boost converter 240 may increase an input voltage provided by the power storage device 230 to a higher voltage which may be supplied to the load 250 during a peak power condition.

Controller 235 may include a current sensor which may monitor current supplied to the load 250. Current sensor may be implemented in a variety of ways. Current sensor may include a voltage comparator and a measured voltage across a known resistance. Based upon the current supplied to the load 250, controller may activate operation of the boost converter 240 to provide supplemental power to the load when power supply 210 is unable to provide enough current. For example, controller may activate operation of the boost converter when the current is above a threshold amount of current. Controller 235 may control boost converter 240 to maintain a constant output voltage while the voltage supplied by storage device 230 and coupled to boost converter 240 is decreasing during an entirety of a peak power condition, for example, from a few milliseconds to about thirty (30) seconds. Controller 235 may be a pulse width modulated controller and may control a duty cycle of the boost converter 240 to provide a desired constant output power.

Power storage charger 220 may be coupled to the controller 235 whereby the power supply 210 may supply power to the power storage charger 220 when the power supply is operational and is receiving input power from the AC source 250. Power storage charger 220 may include a buck converter to reduce the voltage provided by the power supply coupled to the storage device.

In an exemplary embodiment of the present invention, power supply 210 and supplemental power system may provide power for a 400 Watt (W) storage system. Power storage device 230 may be appropriately sized (e.g. voltage, capacitance and the like) to provide supplemental power during a peak power condition of a 400 W storage system. A power storage device 230 in the form of a capacitor may have a capacitance greater than 1 Farad. For example, capacitor may be a 120 Farad capacitor that may be charged to 3 volts and may be discharged to 1 volt. A discharge current from the capacitor may increase from approximately 50 amperes to 100 amperes. In such an implementation, supplemental power system 200 may provide supplemental power for a peak power condition of about thirty seconds. A peak power condition of thirty seconds may be suitable for providing peak power associated with a startup process for an array of disk drives. It is contemplated that supplemental power system may be sized to provide less or more peak power for a desired amount of time in order to provide supplemental power for a variety of applications.

In such an implementation where capacitor may be charged to three volts, power storage charger 220 may include a buck converter which converts an output of the power supply, such as 12 volts, to a reduced voltage such as 3 volts, suitable for charging a capacitor. A buck converter may include a transistor, such as a field effect transistor, a diode, an inductor and a control circuit to assure a constant charge current to the capacitor and to cut off the charge when capacitor reaches the maximum specified voltage, such as 3 volts. It is further contemplated that capacitor may supply a higher initial voltage, such as 12 volts, by stacking a plurality of capacitors.

Capacitor may refer to a supercapacitor or ultracapacitor. A supercapacitor may be an electrochemical capacitor with a large amount of storage capacity relative to its size and unavailable with conventional capacitors that may provide high rates of charge and discharge and may be accompanied with minimal degradation over many cycles in comparison to rechargeable batteries that tend to lose storage capability after many cycles. A supercapacitor may employ electrodes and electrolyte rather than conductive foils and dry separators employed in conventional capacitors. Electrode materials utilized by supercapacitors may include high surface area activated carbons, metal oxide and conducting polymers. Supplemental power system may be fully re-charged in a short time period and may be quickly re-charged during periods of full power received by the power supply 210. It is understood that the storage device (capacitor or battery) is to be charged to the device's maximum voltage before the load is enabled to ensure the device may provide the supplemental power for the startup of the load at the same time as the input AC source is switched on. It is contemplated that any type of power storage device may be employed by those with ordinary skill in the art in conjunction with the supplemental power system of the present invention without departing from the scope and intent of the present invention.

While supplemental power system 100, 200 of FIGS. 1-2 disclose operation with a single power supply, it is contemplated that supplemental power system 100, 200 may be operable with multiple, parallel-connected, redundant power supplies without departing from the scope and intent of the present invention. Additionally, a load 250 of FIG. 2 may include an array of disk drives. However, load 250 may refer to any type of load that may require a steady state load and occasionally a peak power amount which may be double or even larger than a steady state amount of power.

Figure 3:
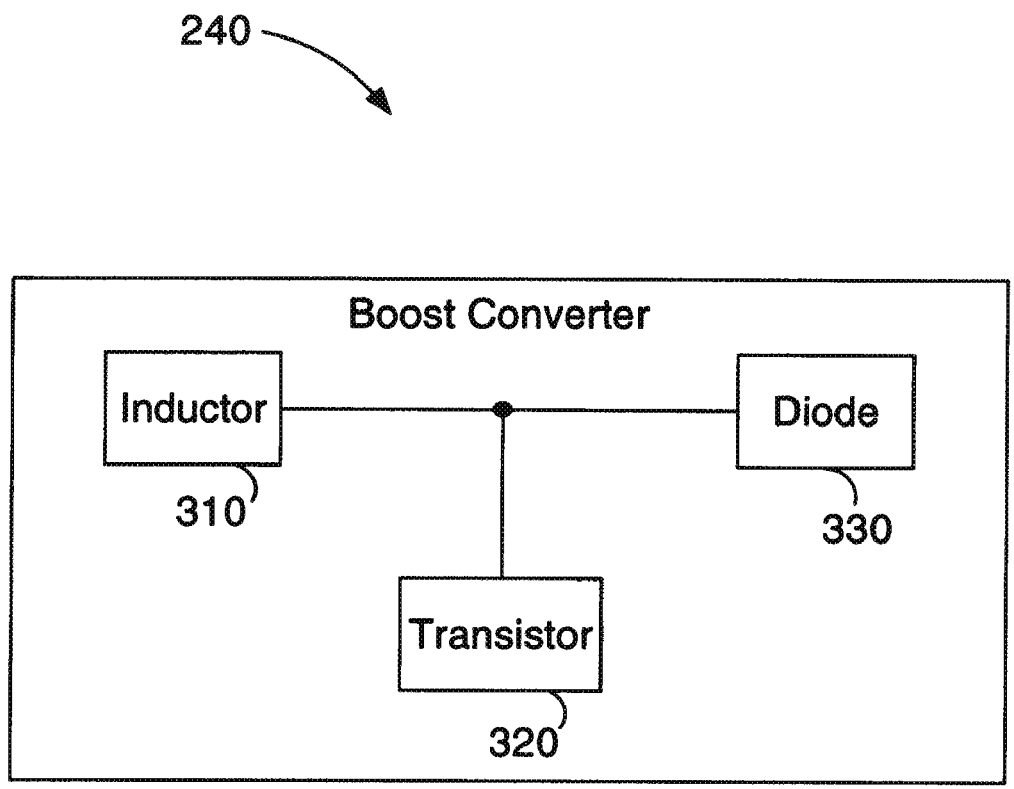
FIG. 3 depicts a block diagram of a boost converter.

Referring to FIG. 3, a block diagram of a boost converter 240 is shown. Boost converter 240 may include an inductor 310, a transistor 320 and a diode 330. The output voltage of the boost converter 240 may be dependent upon the inductance value of inductor 310. During a discharge phase, inductor current flows through diode 330 to charge the output and increase the output voltage to a higher voltage than the input voltage supplied by power storage device 230 of FIG. 2. The higher voltage may be held constant through a feedback loop of the boost converter 240 to hold a desired output voltage suitable for load 260 of FIG. 2. Transistor 320 may be a field effect transistor, bipolar junction transistor and the like and may operate as a switch within the boost converter 240 to facilitate operation of the boost converter 240.

Figure 4A:
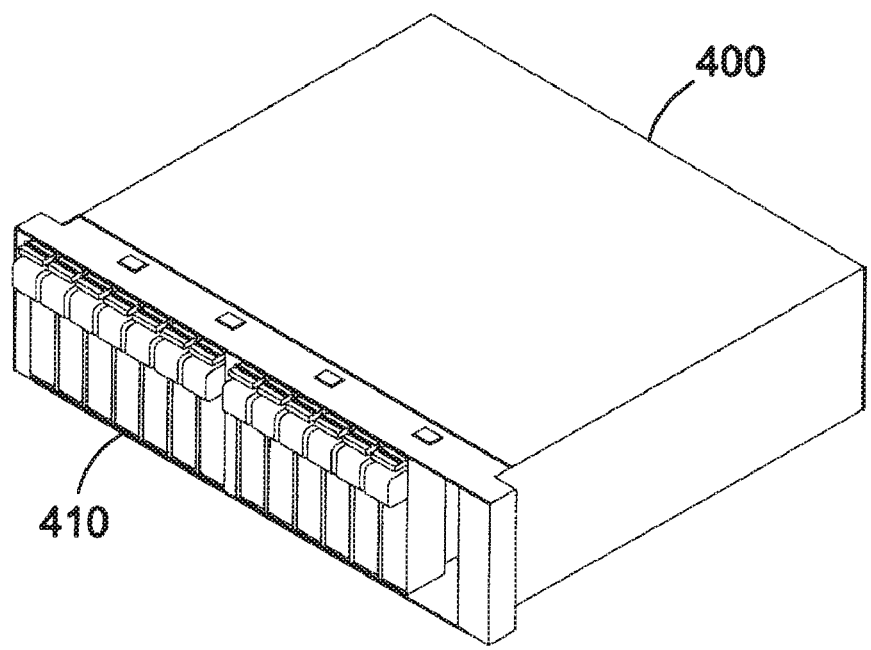
FIG. 4a depicts a storage system.

Referring to FIG. 4a, a storage system 400 is shown. Storage system 400 may include a communication interface, power supplies and a plurality of drives 410. Drives 410 may be removable hard disk drives. Communication interface may couple the plurality of hard disk drives with a locally-connected or network-connected computing system.

Figure 4B:
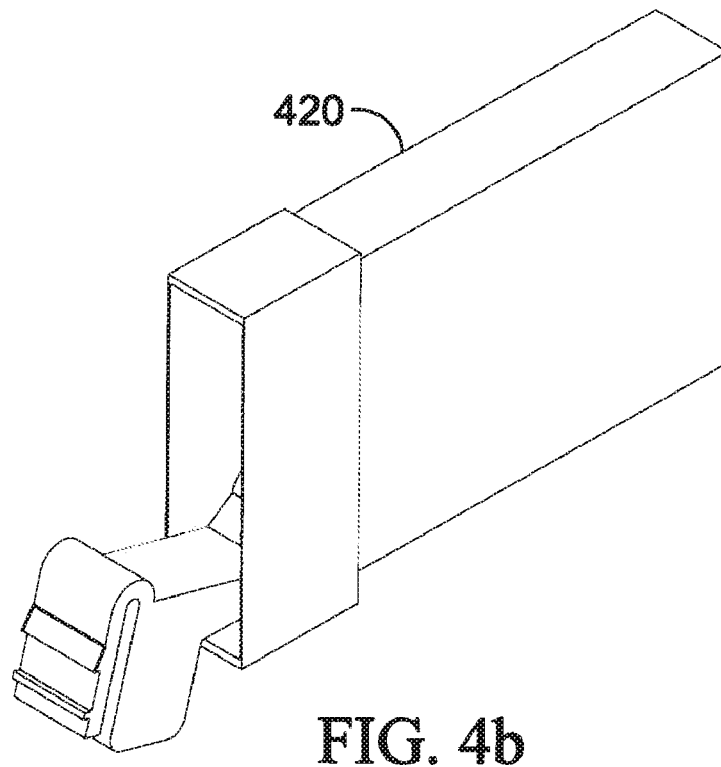
FIG. 4b depicts a drive carrier operable within a storage system and housing a supplemental power system.

Referring to FIG. 4b, a drive carrier 420 operable within a storage system 400 is shown. Drive carrier 420 may include a housing. Driver carrier 240 may house supplemental power system 100, 200 as shown and described in FIGS. 1-2. When the drive carrier 420 is inserted within a slot of a storage system, supplemental power system contained within drive carrier 420 may be installed and configured to supply supplemental power to drives 410 during a peak power condition, such as a startup process. In an alternative embodiment, supplemental power system may be coupled to a backplane of drives 410 through cables, connectors and the like.

Figure 5:
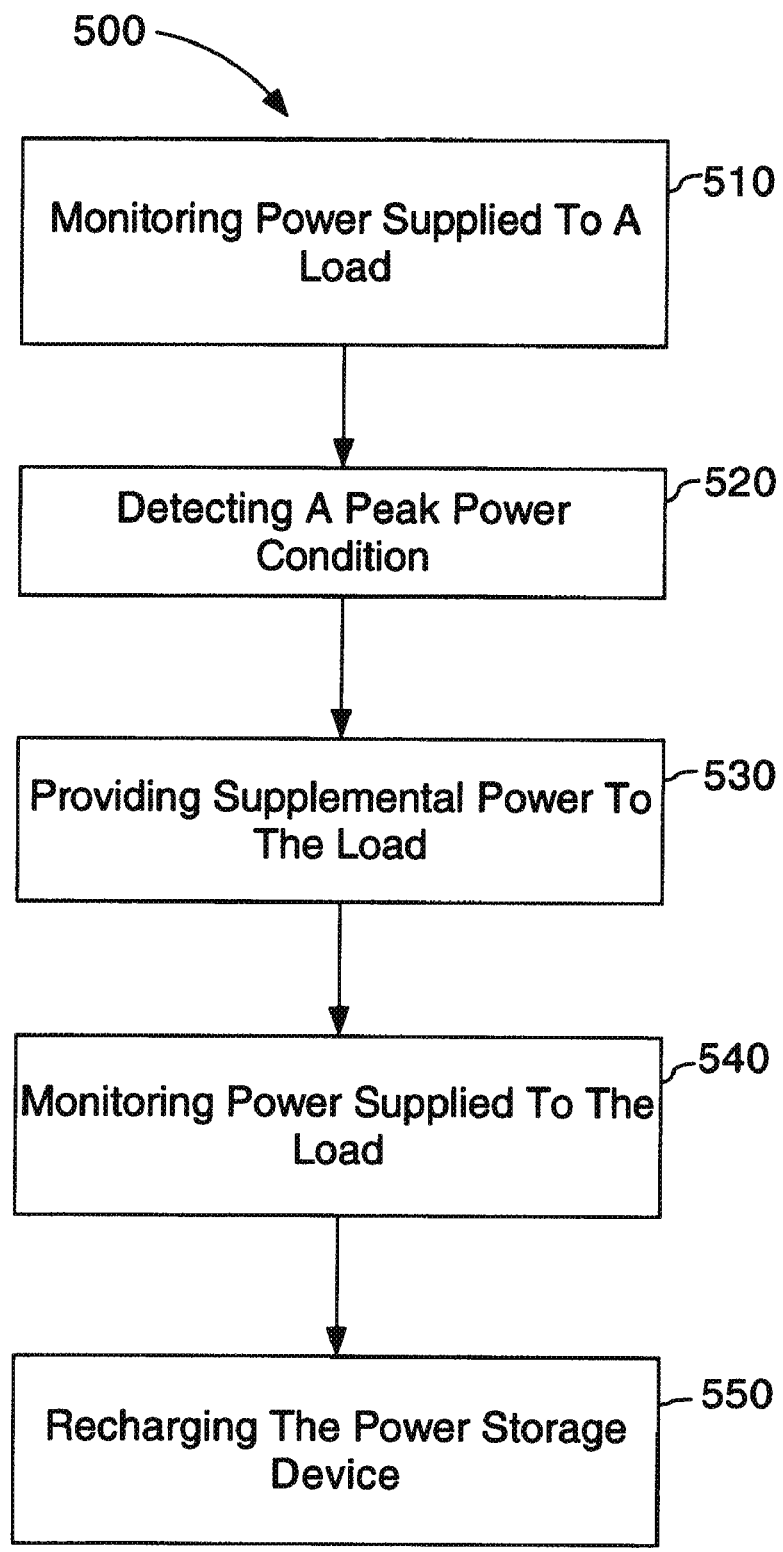
FIG. 5 depicts a flow chart of a method for providing supplemental power.

Referring to FIG. 5, a flow chart of a method 500 for providing supplemental power is shown. Method 500 may be performed by the supplemental power system 100, 200 of FIGS. 1-2 in order to provide supplemental power during a peak power condition, such as a startup process. Method 500 may include monitoring power supplied to the load 510. Method 500 may include detecting a peak power condition where supplemental power is required to support a load 520. Detecting a peak power condition may include detecting a current to the load greater than a threshold amount of current. Method 500 may include providing supplemental power to load through a power storage device and boost converter 530. Upon providing supplemental power to the load during a peak power condition, method 500 may resume monitoring power supplied to the load 540. Additionally, method 500 may include recharging a power storage device 550 whereby the power storage device may be operable to provide supplemental power during another peak power condition.

It is contemplated that supplemental power system 100, 200 of FIGS. 1 and 2 respectively and method 500 for providing supplemental power of FIG. 5 may be implemented with a storage system to enhance reliability and reduce cost and form factor of the storage system. A storage system may refer to a centralized repository for information with common data management and protection. An example of a storage system may refer to a storage solution employing a NetApp Data ONTAP® storage operating system manufactured by Network Appliance of Sunnyvale, Calif. It is contemplated that the storage solution may include a single device, such as a computing appliance. Alternatively, a storage system may comprise a plurality of devices which are operatively coupled to form storage area network (SAN), network-attached storage (NAS) and the like.

It is believed that the supplemental power system of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for providing supplemental power for a power supply, comprising:
  a power supply, said power supply including an input for receiving an AC input supply and an output for providing a DC supply, said power supply providing a first amount of power to a load; and
  a supplemental power system, said supplemental power system housed within a drive carrier housing, said supplemental power system housed within said drive carrier housing includes:
    a controller, said controller coupled to said output of said power supply, said controller configured to measure current supplied to said load;
    a power storage charger coupled to said power supply;
    a power storage device coupled to said power storage charger; and
    a boost converter coupled to said power storage device, wherein said controller is configured to detect a peak power condition and initiate operation of said boost converter whereby said power storage device discharges energy through said boost converter to said load to provide supplemental power for said peak power condition, said power storage device provides an input voltage to said boost converter and the boost converter provides a voltage higher than said input voltage, said voltage provided by said boost converter being supplied to said load during said peak power condition, said peak power condition requiring an amount of power greater than said first amount of power.

2. The system as claimed in claim 1, wherein said power storage device is a capacitor.

3. The system as claimed in claim 1, wherein said power storage device is a battery.

4. The system as claimed in claim 1, wherein said boost converter includes an inductor, a transistor and a diode.

5. The system as claimed in claim 4, wherein said controller is a pulse width modulated controller.

6. The system as claimed in claim 5, wherein said pulse width modulated controller controls a duty cycle of said boost converter.

7. The system as claimed in claim 5, wherein said pulse width modulated controller controls said duty cycle of said boost converter to provide a substantially constant output voltage during said peak power condition.

8. The system as claimed in claim 1, wherein said peak power condition has a duration of a few milliseconds to about thirty seconds.

9. The system as claimed in claim 1, wherein said load is a plurality of drives.

10. A storage system; comprising:
    at least one power supply, said at least one power supply including an input for receiving an AC input supply and an output suitable for providing a DC supply, said at least one power supply providing a first amount of power;
    a plurality of drives, said plurality of drives receiving said first amount of power from said at least one power supply; and
    a supplemental power system, said supplemental power system housed within a drive carrier housing associated with said plurality of drives, said supplemental power system includes:
    a controller, said coupled to said output of said power supply, said controller configured to measure current supplied to said plurality of drives;
    a power storage charger coupled to said at least one power supply;
    a power storage device coupled to said power storage charger; and
    a boost converter coupled to said power storage device, wherein said controller is configured to detect a peak power condition and initiate operation of said boost converter whereby said power storage device discharges energy through said boost converter to said plurality of drives to provide supplemental power for said peak power condition, said power storage device provides an input voltage to said boost converter and the boost converter provides a voltage higher than said input voltage, said boost converter providing supplemental power to said plurality of drives during a startup condition of said plurality of drives which requires an amount of power greater than said first amount of power.

11. The system as claimed in claim 10, wherein said power storage device is a capacitor.

12. The system as claimed in claim 10, wherein said power storage device is a battery.

13. The system as claimed in claim 10, wherein said boost converter includes an inductor, a transistor and a diode.

14. The system as claimed in claim 13, wherein said boost converter provides supplemental power for a duration of a few milliseconds to about thirty seconds.

15. The system as claimed in claim 14, wherein said startup condition of said plurality of drives requires an amount of power double said first amount of power.

\* \* \* \* \*